Figure 16:
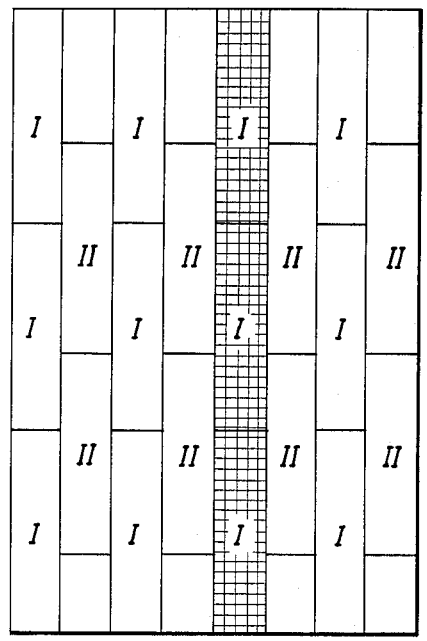

July 19, 1966  A. WEHNER  3,261,469
VIBRATING SCREEN WITH COUPLING MEANS
Filed March 27, 1963  3 Sheets-Sheet 1
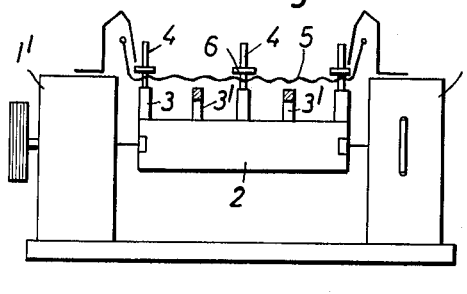
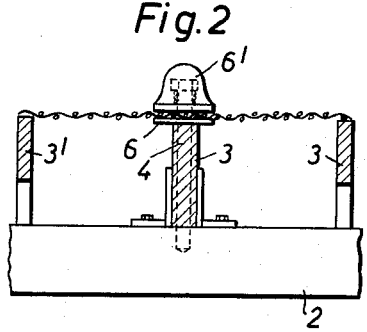
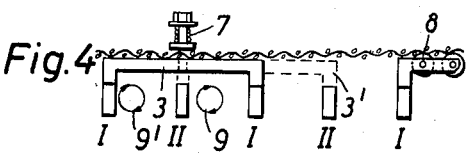
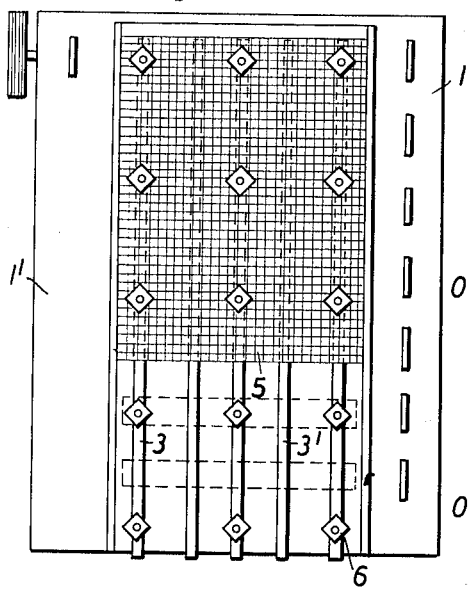
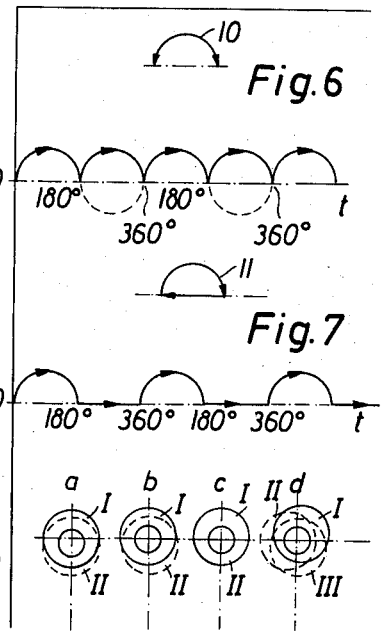
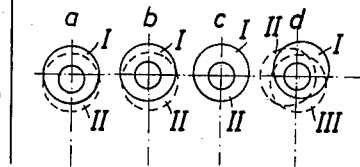
INVENTOR
ALBERT WEHNER
BY
ATTORNEY July 19, 1966  A. WEHNER  3,261,469
VIBRATING SCREEN WITH COUPLING MEANS
Filed March 27, 1963  3 Sheets-Sheet 2
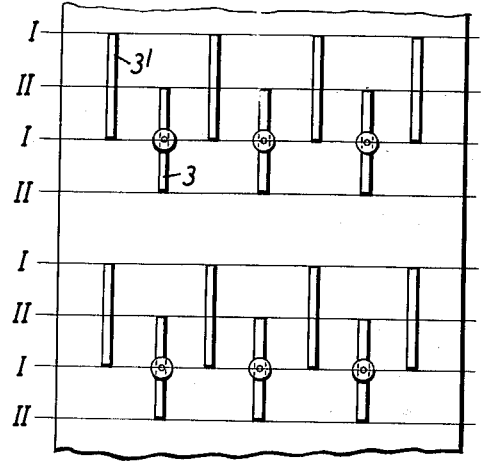
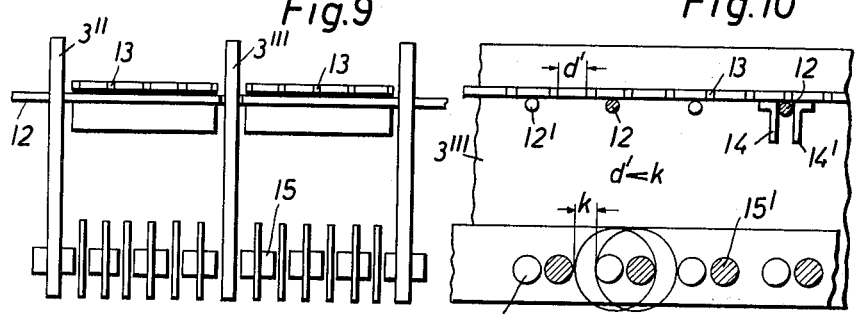
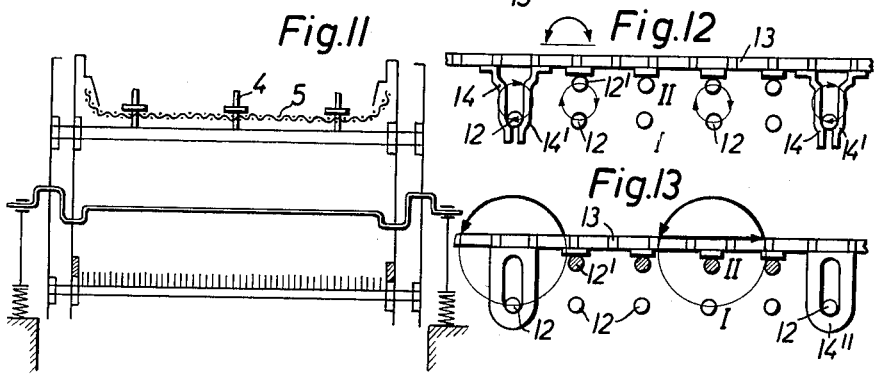
INVENTOR
ALBERT WEHNER
BY
ATTORNEY July 19, 1966     A. WEHNER     3,261,469
VIBRATING SCREEN WITH COUPLING MEANS
Filed March 27, 1963     3 Sheets-Sheet 3

INVENTOR
ALBERT WEHNER
BY
ATTORNEY

United States Patent Office 3,261,469
Patented July 19, 1966

3,261,469
VIBRATING SCREEN WITH COUPLING MEANS
Albert Wehner, Weberstrasse 31, Monheim
(Rhine), Germany
Filed Mar. 27, 1963, Ser. No. 268,411
Claims priority, application Germany, Mar. 28, 1962,
W 31,933
3 Claims. (Cl. 209—325)

This invention relates to an apparatus for screening very fine, difficultly screenable, materials, particularly materials which cause considerable wear.

In the specification of my co-pending patent application No. 212,037, now Patent No. 3,217,881 (hereinafter referred to as the Parent Specification) there is described and claimed a screen in the form of a directly vibrated plate, cloth or mat, in which the screen bears resiliently or loosely on relatively contra-gyrating interposed bearing or supporting members in such manner as to be subjected to elastic or inelastic jogging impacts impressed on the screen by the moving bearing or supporting members. The screening surface performs substantially linear vibratory motions.

It is the object of the present invention further to improve and develop the screen described in the parent patent and, particularly, to perfect the same so that its screening surface can be made to perform more effective vibratory or oscillatory movements. It is proposed that the screening surface as a whole or some of its component parts should be directly coupled to at least one of the oscillating bearer member systems, whereas the other bearer member system is primarily used to act as a deflecting means. According to the invention the screening surface cooperating with an intermediate frame supporting the same is provided with coupling means slidably engageable by cooperating entraining members affixed to one group of bearer members in such manner that the screening surface is forced to participate in the oscillating motion of said entraining members, excepting during certain phases of the oscillatory motion during which the screening surface is under the influence of the bearer members of the other group and is deflected to move in relation to the entraining members.

It is thus possible to generate two completely novel types of basic oscillatory cycles for vibrating a screen on its screening surface. One of the said two oscillatory cycles which is principally suitable for downwardly sloping screens consists in that the screening surface is forced to perform a vertical circular or semicircular reciprocatory to and fro motion. The other novel oscillatory cycle imparted to the screening surface is one applicable both to sloping and horizontal screening surfaces and consists in what may be termed a half-moon cycle comprising a semicircular or arcuate forward movement of the screening surface or its components followed by a linear horizontal return from the end of the circular path of motion to the beginning thereof. Moreover, these two basic oscillatory cycles can be modified by providing displacements in phase between the oscillations of twin or multiple vibratory systems and thereby generating alternative oscillatory cycles. However, for most screening operations it is quite sufficient to make the screening surface perform one of the two basic oscillatory cycles. It is a particular feature of the proposed arrangement that the advantageous effects of the screening device described in the parent patent are fully exploited, which consist in that, unlike conventional solutions of the problem of vibratory screens, only small inertial masses need be accelerated for a similar separatory action, in that the screen members are not roughly used and in that the otherwise difficult process of stretching a screen cloth is eliminated.

As has been mentioned the screening surface need not directly rest on the driving or bearer members. The screening surface may be supported on a divided or integral screening or intermediate frame to which the bearer or vibrating systems are coupled for entraining or deflecting the frame and/or the screen. It is also a matter of importance that the machine elements which operate the intermediate frame should impart motion thereto in accordance with the oscillatory cycles proposed by the invention, i.e. semicircular or full circular reciprocation or a half moon oscillation. Since the intermediate or screening frame supports the screening surface, the driving mechanism can be kinematically simplified and driving or bearer members which interengage in countermotion can be dispensed with, since the intermediate frame as a whole can be moved by appropriately designed driving elements. The decisive feature in every case is that the screening surface is actually forced to perform the basic oscillatory cycles according to the invention either directly or indirectly through the intermediary of the supporting frame by temporarily resting upon, being deflected by, and being transferred from one to the other of, several driving members during each oscillatory cycle.

Conveniently the slideways formed by the coupling members of the screening surface or the supporting intermediate frame for engagement of the entraining members of the bearer member sections may extend perpendicularly to the screening surface. However, for certain particular purposes this slideway might also be arranged to extend parallel to the screening surface.

According to another feature of the invention the slideways may take the form of eyelets in the screening surface slidably engaged by entraining pins which project vertically from the bearer members comprised in the group. Thrust plates may be located above the eyelets and urged by springs supported from the upper extremities of the entraining pins to press the eyelets in the screening surface against the associated bearer members. In the course of the motion of the bearer members, assuming for instance that these are attached to one of two circularly rotating vibratory grate systems, the screening surface is moved, by the entraining pins which slidably engage the eyelets and by the bearer members to which the pins are attached, in such a way during the first half of the oscillation (0–180°) that the screening surface and/or its components travel through a circular path. Towards the end of the first half of the oscillatory cycle both vibratory grate systems are in the same horizontal plane and the bearer members of the other grate system will therefore now come into contact with the underside of the screening surface and lift the same. Nevertheless, the upright entraining pins remain in sliding engagement with the eyelets and thereby force the screening surface to participate in the retrograde motion of the grate system to which the pins are attached. In the course of a complete oscillatory cycle the screening surface will therefore perform a to and fro motion along the same semicircular arc.

An oscillatory cycle of such a kind is of considerable importance in ensuring an improvement in screening efficiency and in preventing the screening surface from being choked, because even particularly moist and sticky screen feeds are thus vibrated in a way producing a satisfactory screening effect even on materials upon which conventional screens have no effect. By its semicircular reciprocating oscillation the screen will break up layers in the screen feed which are the most likely to cake and in conjunction with the slope of the screening surface contrary flow patterns will be induced in the feed which improve screening efficiency by reason of the greater amount of throwing and overturning experienced by the feed. Since at the same speed of rotation of the screen drive means as in a conventional screening machine twice the vibratory frequency and in a three system drive even three times the frequency of oscillation is generated, the accelerational forces are correspondingly high although the components of the machine are subject to no greater stress. There is therefore also an improved opening-up effect on the feed.

Similarly advantageous effects are also achieved when using the other above described oscillatory cycle for moving the screening surface, in which the latter reciprocates by moving along a semicircular path in one direction and along a linear horizontal path in the other direction. This oscillatory pattern can be achieved simply by keeping one group of bearer members stationary or by merely reciprocating the latter in a balancing to and fro movement parallel to the screening surface, whereas the other group of bearer members imparts the actual oscillatory motion to the screening surface through the sliding coupling means. The difference in the generation of the latter form of oscillation from the above described pattern of oscillation in which the screening surface moves to and fro along a semicircular arc therefore consists in that the driving system which carries no entraining members engaging the screening surface imparts no vertical component of motion to the screening surface. By appropriately designing one of the bearer member systems, oscillatory cycles can be generated in which for instance the radius of the circular path during the forward motion is smaller than that of the circular path of the return motion.

In many cases it may be advisable to build up the screening surface of a plurality of transverse strips of given length instead of providing an unbroken single surface. In inclined screens the individual transverse strips may form steps projecting from the general screen surface. For particular applications it may be even better to subdivide the screen surface into independent components both crosswise and lengthwise. Such screening components can be very conveniently driven by two grate systems in which the bar sections are provided with lateral extensions which gyrate about one another. The screen components may then be driven by the cross members which in such a case form the bearer members of the screening surface.

Figure 14:
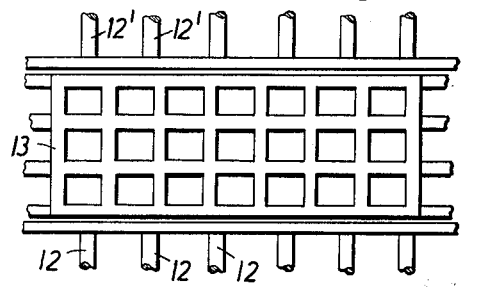
Figure 15:
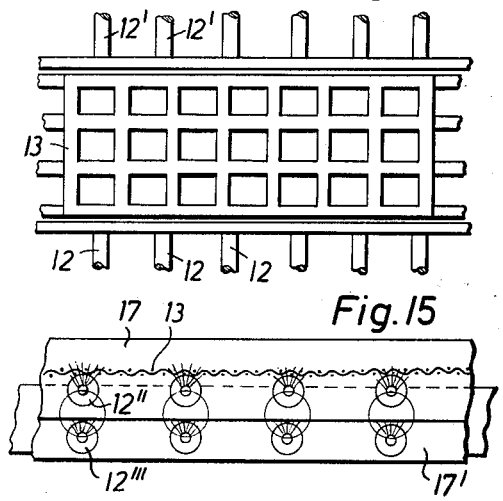
Figure 17:
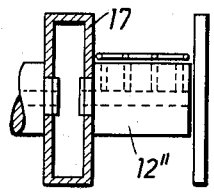
Figure 18:
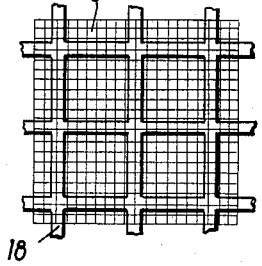

Other features of the invention will now be described by reference to embodiments of screens schematically shown in the accompanying drawings, in which:

FIGURE 1 is a front elevation of a sifting machine equipped with the proposed screen and associated drive means, FIGURE 2 is a fragmentary section, on an enlarged scale, of part of FIGURE 1, FIGURE 3 is a plan of the machine of FIGURE 1, FIGURE 4 is a side elevation of a screen with bearer members of limited length, FIGURE 5 is a plan of the arrangement illustrated in FIGURE 4, FIGURES 6 and 7 illustrate different oscillatory cycles for the proposed screen, FIGURE 8 illustrates different relative positions of the eccentric drives of the two driving and bearer member systems of the screen, FIGURE 9 illustrates a combination of the proopsed screen and a screening system based on the known Umbra principle, FIGURE 10 is a side elevation of the screen shown in FIGURE 9, FIGURE 11 illustrates a sifting machine comprising an upper deck formed by a screen according to the invention in combination with an Umbra screen forming the lower deck, FIGURE 12 shows a drive means for oscillating a screen in reciprocatory motion along a semicircular path, FIGURE 13 shows a drive means for oscillating a screen along a circular path in the forward direction and a straight horizontal path in the backward direction, FIGURE 14 is a plan of the screening surface according to FIGURE 12 or 13, FIGURE 15 is a section of a screen provided with supplementary means for aerating the feed through the bearer members of the drive means, FIGURE 16 is a plan of a screening surface subdivided into a plurality of strips, FIGURE 17 illustrates the structural solution of the aearating principle shown in FIGURE 15, and FIGURE 18 is a plan of a screen comprising a coarse mesh supporting a superimposed fine mesh screen cloth.

In the sifting machine schematically illustrated in FIGURE 1, which is equipped with a twin system vibrating grate, the driving transoms 2 are mounted between gear blocks 1, 1' and operate the bearer members in groups which move in relation to one another. The bearer members or bars 3 of one group carry entraining pins 4 which project through eyelets 6 in a screening surface 5, such as a screen cloth. The pins 4 slidably pass through the eyelets. In the course of operation of the driving systems the pins 4 on the rising bearer bars 3 first carry the screen cloth 5 forwards in feeding direction along a semicircular path, and the pins 4 then restore the cloth 5 to its starting position during the second half of the oscillatory cycle. Since the pins 4 travel downwards through a semicircle during this second part of the cycle, the cloth 5 will be deposited on the bearer members or bars 3' of the other driving system during this return motion. However, since in this half cycle the latter bearer bars travel along an upward circular path they will lift the cloth 5 again and return it to its former position along the same circular path along which it had previously travelled in the forward direction. The return motion of the cloth 5 is therefore determined by the initially rising and then falling motion of bearer bars 3' and by the return motion of the entraining pins 4 which move with the other system of bearer bars 3. All points of the cloth 5 will therefore oscillate in a to and fro motion on a semicircle 10 which is the same in both directions.

As will be understood from FIGURE 2 thrust plates 6' are provided above the eyelets 6 in cloth 5 and by the action of springs 7 supported at the upper extremities of pins 4 the eyelets 6 in cloth 5 are urged against the associated bearer bars 3. Despite the slidable cooperation of the pins 4 and the eyelets 6, the cloth 5 will nevertheless be constrained to participate in the downward dipping motion of the pins 4 until it is intercepted during the second half of the cycle by the ascending bearer bars 3' of the other system.

FIGURE 3 illustrates a possible arrangement of the eyelets 6 through which the pins 4 slidably pass. The eyelets are attached to the cloth 5 and may be round or polygonal. FIGURE 3 also shows the distribution and relative arrangement of the bearer bars 3, 3' of the two systems which oscillate the screens.

In the embodiment illustrated in FIGURES 4 and 5 the bearer bars 3, 3' which are associated with the two driving systems I and II, are U-shaped. They are short and extend along a relatively short part of the screen cloth. In order to avoid rubbing friction the bearer bars 3 and 3' may be provided with special bearing or pusher rollers 8, as will be understood by reference to FIGURE 4. The arrowed circles 9 and 9' illustrate the shape of the path of oscillation of the two systems of bearer bars I and II or of their U-shaped impact sections 3 and 3'.

The oscillatory curve 11 of the screen cloth (FIGURE 7) is generated if the driving system which has no entraining pins 4, i.e. the system II associated with bearer bars 3', has no vertical component of oscillation, for instance because this system is stationary. In such a case the screening surface moves in a semicircular path only during the first half of the oscillatory cycle when entrained by the pins 4 of bearer bars 3 comprised in driving system I. During the second half of the oscillatory cycle the screening surface returns to its former position along a horizontal i.e. linear path. This gives rise to a half-moon-shaped path 11. This type of oscillation would not be altered if system II which comprises bearer bars 3' were to perform a horizontal reciprocatory oscillation. It may be an advantage to impart such a reciprocatory horizontal motion to the system of group II in order to provide a balancing oscillation to that of system I and in order to eliminate the friction with the screen surface which would arise if system II were stationary.

FIGURE 8 illustrates different relative eccentricities of the two systems I and II, all of which permit the problem which underlies the invention to be solved. In the first case marked "a," in which the two eccentrics are 180° out of phase, the half cycles of the oscillation generated by the two systems I and II will be in antiphase. In the case marked "b" the two driving systems I and II are driven by eccentrics which are relatively displaced by an angle other than 180° C. Case "c" symbolises an arrangement in which the screen is driven only by one system I, whereas the other system II remains stationary to generate the oscillation shown in FIGURE 7. In case "d" the screen is driven by three separate systems I, II and III which operate at relative phase angles of 120°.

In the embodiment shown in FIGURES 9 and 10 the screen 13 is driven by a self-cleaning Umbra screening apparatus located underneath, which comprises a plurality of adjacent bar sections fitted with lateral projections 15, said bar sections being alternately associated with a first driving group I and a second driving group II and moving in such a way that the projections 15 of one group of bar sections gyrate around the projections 15 of the other bar system. Upright grate bars 3" and 3'" are connected to transoms 12 and 12' which support strips or screen components 13 which together form the screening surface proper. In other words, these screen strips or screen components are oscillated by the gyrating transoms 12 and 12' in the manner proposed by the invention. It will be seen by reference to FIGURES 10 and 12 that the underside of the screen strips 13 are fitted with entraining members 14 and 14' which slidably embrace some of the transoms 12 of one of the driving systems (say I). Instead of providing a pair of entraining members 14, 14' a single correspondingly placed lug 14", as shown in FIGURE 13, may be attached to the underside of the screening surface and provided with a vertical slot. A screening surface associated with drive means thus contrived is likewise capable of performing the oscillatory motions illustrated in FIGURES 6 and 7. In the present case, that is to say in a combination of a screen cloth, oscillated as proposed by the invention, and an Umbra screen, it is preferable to use screen strips 13 in which the opening of the mesh $d'$ is less than the distance "$k$" between associated projections 15 and 15' when these are horizontally aligned (of FIGURE 10).

In the embodiment according to FIGURE 11 the proposed screening surface and the Umbra screen used for oscillating the same are combined in a sifting machine to form separate screen decks.

In the embodiment according to FIGURE 12 the cross members 12, 12' on the sides of the bar sections of two oscillating gratings I and II gyrate in pairs around a common circular path and impart an oscillatory motion to the screening surface or its components which has the semicircular form indicated by the double-headed arrow, the screen moving to and fro in a semicircular reciprocation. This form of reciprocation is generated because the entraining members 14, 14' on the underside of the screening surface embrace some of the cross members 12 of one of the oscillating gratings (say I) and transmit at least their horizontal component of oscillation to the screen, whereas the vertical component of oscillation is imparted to the screen 13 by the alternate lifting movement of the cross members 12 and 12' comprised in the one and in the other system I and II. It will be noted that the vertical length of the slot formed between the entraining members 14, and 14' is greater than the cross-sectional dimension of the cross members 12.

The arrangement shown in FIGURE 13 is adapted to generate the half moon oscillation 16. This is produced in that system II and its cross members 12' remain stationary, whilst system I and cross members 12 perform a gyrating motion about the cross members 12' of the other system. Some of the cross members 12 are again slidably coupled with entraining lugs 14" attached to screen 13 by engaging the slots in the lugs, and this coupling connection continuously transmits to the screen 13 the horizontal component of motion of the cross members 12, whereas the vertical component of motion is transmitted only when the cross members 12 are in a position above the cross members 12' of the stationary system I.

FIGURE 14 is a fragmentary plan of the screen according to FIGURE 12 or 13.

FIGURE 15 illustrates yet another form of construction of the cross members 12" and 12'" which alternately engage the underside of the screen and which in this example are contrived to deliver gaseous or liquid media to the screened material by being fitted to hollow grate bars 17 and 17'. By supplying gaseous or liquid media to parts of the screening surface the screening or conditioning process may be effectively assisted.

In the embodiment according to FIGURE 16 the screening surface is subdivided into a plurality of longitudinal strips or fields which are driven or oscillated by relatively moving drive systems I and II in the manner proposed by the invention.

FIGURE 18 exemplifies the manner in which a very fine mesh screen 19 can be suitably supported by an intermediate frame or a coarse mesh screen which is suitable for cooperation with drive means of the kind proposed by the invention.

I claim:
1. A screening assembly comprising:
   a first set of transversely spaced supporting grate bars;
   a second set of transversely spaced supporting grate bars, the grate bars of said second set being interdigitated between the grate bars of said first set, and the grate bars of said first and second sets being movable relative to one another through arcuate paths in parallel vertical planes;
   extended surface mesh screen means supported in superimposed relation on the grate bars of said first and second sets;
   said grate bars including first and second sets of respective cross members affixed thereto, entraining members depending from the under surface of said mesh screen means, each of said entraining members containing a vertically extending slot, the vertical length of said slot being greater than the cross-sectional dimension of said cross members, said cross members of at least one of said sets of grate bars being slidingly entrained in respective ones of the slots of said entraining members; and
   means for imparting relative rotational movement to the grate bars of said first and second sets.

2. A screening assembly comprising:
   a first set of spaced supporting grate bars;
   a second set of spaced supporting grate bars, the grate bars of the second set being interdigitated between the grate bars of said first set, and the grate bars of said first and second sets being movable relative to one another through arcuate paths in parallel vertical planes;
   an extended surface mesh screen element supported in superimposed relation above the grate bars of said first and second sets;

coupling means for slidingly fastening said screening element to the grate bars of said first set, said coupling means including a plurality of entraining pins projecting vertically from the grate bars of said first set, a plurality of eyelets in said extended surface mesh screen element, said eyelets being positioned to receive said entraining pins, a thrust plate on each of said entraining pins adjacent the respective one of said eyelets, and spring means for urging said eyelets against the associated grate bars; and means for imparting relative movement to the grate bars of said first and second sets.

3. A screening assembly according to claim 2, in which the grate bars of said first and second sets are provided with rollers for supporting the under surface of said extended surface screen element.

References Cited by the Examiner

UNITED STATES PATENTS

| | | | |
|---|---|---|---|
| 839,317 | 12/1906 | Rapoport | 209—347 |
| 1,121,985 | 12/1914 | Custer | 209—347 |
| 1,707,251 | 4/1929 | Cederquist | 209—347 |
| 2,247,271 | 6/1941 | Barlow | 209—310 |

FOREIGN PATENTS

| | | |
|---|---|---|
| 2,993 | 8/1900 | Austria. |
| 756,583 | 9/1933 | France. |
| 1,179,805 | 12/1958 | France. |
| 971,314 | 1/1959 | Germany. |
| 287,681 | 3/1928 | Great Britain. |

HARRY B. THORNTON, *Primary Examiner.*

R. HALPER, *Assistant Examiner.*